United States Patent [19]

Shaw

[11] Patent Number: 4,633,488
[45] Date of Patent: Dec. 30, 1986

[54] PHASE-LOCKED LOOP FOR MFM DATA RECORDING

[75] Inventor: Robert A. Shaw, Longmont, Colo.

[73] Assignee: Digital Equipment Corporation, Maynard, Mass.

[21] Appl. No.: 670,825

[22] Filed: Nov. 13, 1984

[51] Int. Cl.⁴ .......................... H04L 7/02; G11B 5/09
[52] U.S. Cl. .................................... 375/120; 307/269; 328/72; 328/155; 331/1 A; 360/51; 375/110
[58] Field of Search ............... 375/120, 119, 118, 110; 307/511, 269; 328/72, 55, 155, 63; 331/1 A; 360/51

[56] References Cited

U.S. PATENT DOCUMENTS

| | | | |
|---|---|---|---|
| 4,017,803 | 4/1977 | Baker | 375/120 |
| 4,357,707 | 11/1982 | Delury | 360/51 |
| 4,527,277 | 7/1985 | Kosaka et al. | 375/120 |

*Primary Examiner*—Marc E. Bookbinder
*Assistant Examiner*—Andrew J. Telesz, Jr.
*Attorney, Agent, or Firm*—Cesari & McKenna

[57] ABSTRACT

A phase-locked loop (PLL) for use in decoding MFM data recordings. The loop uses a counter to generate timing signals which divide bitcells into data and clock windows and which define times within these windows at which transitions in the MFM signal are expected to occur. Data and clock windows of differing relative size are readily accomodated. The PLL has two synchronization modes: one mode allows the PLL to take maximum advantage of both data and clock transitions which occur when reading actual data; a second mode is used during the synchronization period at the beginning of a data block and allows the PLL to lock quickly yet assure that it will lock to the bit frequency and not lock to harmonics or beat frequencies. A charge pump generates the PLL error signal by responding to pump-up and pump-down control signals which are set and cleared in response to the timing signals from the counter and in response to the detection of transitions in the input signal. While in data mode, a second counter is used to control the charge pump when a transition occurs after the time the transition is expected to occur. The charge storage circuit of the charge pump control over loop dynamics. The PLL includes a VCO with an automatic dynamic adjustment of the VCO's center frequency which is accomplished by adjusting the reverse bias voltage on a diode that functions as the timing capacitor for the VCO. This adjustment allows the PLL to make maximal use of the VCO's range.

9 Claims, 9 Drawing Figures

PHASE-LOCKED LOOP FOR MFM DATA RECORDING

FIELD OF THE INVENTION

The invention relates to phase-locked loop circuits, and in particular to phase-locked loops useful in decoding magnetically recorded data.

BACKGROUND OF THE INVENTION

Magnetic recording of digital data is typically accomplished by recording a series of transitions, changes in direction of magnetization, the spacing of which defines the data. There are various codes which have been used to correlate the timing of the transitions with digital data.

These codes often provide for the recording of timing information so that, even in the presence of variations in the speed of the recording medium, the timing of playback signals can be correlated with the timing of the signals used to make the recording. In systems capable of recording two or more tracks in parallel, timing information can be provided in a clock track which is recorded in parallel with the track containing the data. On playback, the signal from the clock track indicates at which times the signal from the data track is to be interpretted as data.

At high recording densities it can be difficult to obtain the necessary timing alignment between the clock and data tracks. For this and other reasons, codes have been developed which mix data and clock information on a single track.

One such code, a form of frequency modulation (FM), combines data and clock as follows: a bitcell is the time allocated to encoding of a single data bit; the first half of each each bitcell is a data window, the second half is a clock window; if the data associated with a bitcell is a 1, then there is a transition in the center of the data window, otherwise there is no transition in the data window; there is always a transition in the clock window. In this FM code there is guaranteed to be a transition at the same place in every bitcell (in the middle of the clock window); this fact makes extracting timing information from the combined clock and data signal relatively easy.

A modified version of this FM code (MFM) has been developed in which some of the clock transitions are not written. The minimum distance between recorded transitions is one of the primary factors determining how much data can be recorded on a particular tape or disk. Thus MFM enabled recording at higher data densities than FM. This higher recording density is obtained at the cost of making the clock information more difficult to extract from the MFM signal. This is because in MFM there is no one time within a bitcell in which a transition is guaranteed to occur; in fact, there may be bitcells with no transition at all.

To decode an MFM signal it is necessary to reconstruct the clock signal to get not just the width of the bitcells, but also to get the phase information necessary to identify that portion of the bitcell in which data transitions are to occur that is, the data window. This reconstruction must be accomplished from a mixture of clock and data transitions which occur in an unpredictable mixture which depends on the data which has been encoded.

Phase-locked loops (PLL) have been applied to the task of reconstructing clock signals from MFM signals, but difficulties have been encountered. Data is typically recorded in blocks, between which is a gap without transitions. It is necessary to synchronize at the beginning of each block. One problem experienced with some PLL designs is that during this synchronization period, they can lock to harmonics or beat frequencies, rather than to the bit rate. Another problem is that some PLLs lock slowly, so that if the PPL's frequency at the beginning of the synchronization period is too different from the bit rate, the PLL will not have locked by the end of the synchronization period.

A PLL includes a voltage-controlled oscillator (VCO), the frequency control of which is driven by the loop error signal. A VCO has a limited frequency range over which it can be driven. A larger range can help a PLL lock more quickly and (for loops subject to locking to a harmonic or beat frequency) can make it less likely that the loop will lock to a harmonic or beat frequency.

If the PLL locks to a frequency that is near one of the ends of the frequency range of the VCO, then the extent which the VCO can be driven in that direction is limited. Thus, it is desirable to have the center of the VCO's range correspond to the frequency at which the PLL is locked. Two factors contribute to the difficulty in obtaining this objective: (1) variations in component values create variations in the VCO center frequency among different instances of the same VCO design; (2) variations in other parts of the system (for example, variations in tape speed) can make it impossible to expect the PLL to lock one predetermined frequency. The first source of difficulty can be overcome by providing a trim adjustment; however, this increases the cost of the product by requiring each product to be individually adjusted.

SUMMARY OF THE INVENTION

The present invention aims to provide a phase-locked loop (PLL) which can be used with particular advantage in the decoding of MFM signals. The PLL provides signals which identify separate windows for clock and data transitions. According to the present invention, PLLs can identify clock and data windows which are of arbitrary relative size and in which the times within the windows at which the transitions are expected to occur can be set to any desired value. Further, the PLL has two synchronization modes: one mode allows the PLL to take maximum advantage of both data and clock transitions which occur when reading actual data; a second mode is used during the synchronization period at the beginning of a data block and allows the PLL to lock quickly yet assure that it will lock to the bit frequency and not lock to harmonics or beat frequencies.

The PLL includes timing logic circuitry that includes a counter which divides a bitcell into smaller intervals. This counter provides timing signals which define data and clock windows, and which further define times within those windows when transitions in the MFM signal are expected to occur. A charge pump generates a PLL error signal by responding to pump-up and pump-down control signals. The pump-up and pump-down signals are set and cleared in response to the timing signals from the counter and further in response to the detection of transitions in the input signal. While in the first mode mentioned above, a second counter is used to control the charge pump when a transition occurs after the time the transition is expected to occur.

The charge storage circuit of the charge pump controls the dynamic characteristics of the loop. This circuit is the parallel combination of (i) a resistor in series with a capacitor and (ii) a second capacitor. This particular charge store provides for rapid initial locking of the PLL while also assuring stable loop performance. Resistor and capacitor values can be selected to optimize loop dynamics for a particular system.

The PLL includes a VCO with an automatic adjustment of the VCO's center frequency. This automatic adjustment is accomplished by adjusting the reverse bias voltage on a diode that functions as the timing capacitor for the VCO. The adjustment is arranged so that the center frequency matches the frequency at which the PLL is locked. This allows the PLL to make maximal use of the VCO's range.

BRIEF DESCRIPTION OF THE DRAWING

The invention is pointed out with particularity in the appended claims. The above and other advantages of the invention may be better understood by referring to the following detailed description in conjunction with the drawing in which:

DESCRIPTION OF AN ILLUSTRATIVE EMBODIMENT

Digital data is recorded on a magnetic tape by passing the tape across a recording head which generates a magnetizing field in response to a write signal. The write signal is a two-valued signal. When it is of one value the tape is magnetized in one direction. When the write signal is the other value the tape is magnetized in the opposite direction. The transitions in the write signal from one value to the other correspond to transitions in the magnetization of the tape.

Figure 1:
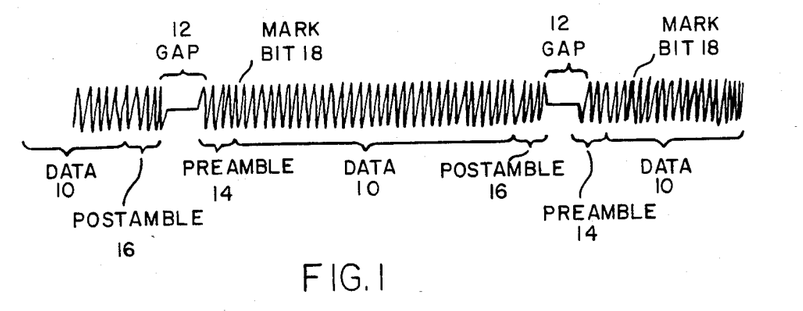
FIG. 1 illustrates the playback signal obtained from a typical data recording, showing the entire extent of one data block and portions of two adjacent data blocks.

Referring to FIG. 1, data is recorded on the tape in groups of data bits called blocks of data 10. Blocks of data 10 are recorded sequentially on the tape. Between blocks 10 the tape is not magnetized; these nonmagnetized regions are called gaps 12. Prior to each block of data 10 is recorded a preamble 14. Following each block of data 10 is recorded a postamble 16. Between the postamble 16 associated with one block 10 and the preamble 14 of the next block 10 is the gap 12. The preamble 12 includes a series of transitions which are used to synchronize the timing of a playback system with the timing of the block of data 10. Following the series of synchronizing transitions, a mark bit 18 is recorded which can be distinguished from the synchronizing transitions by the playback system. The block of data 10 is recorded following the mark bit 18.

Figure 2:
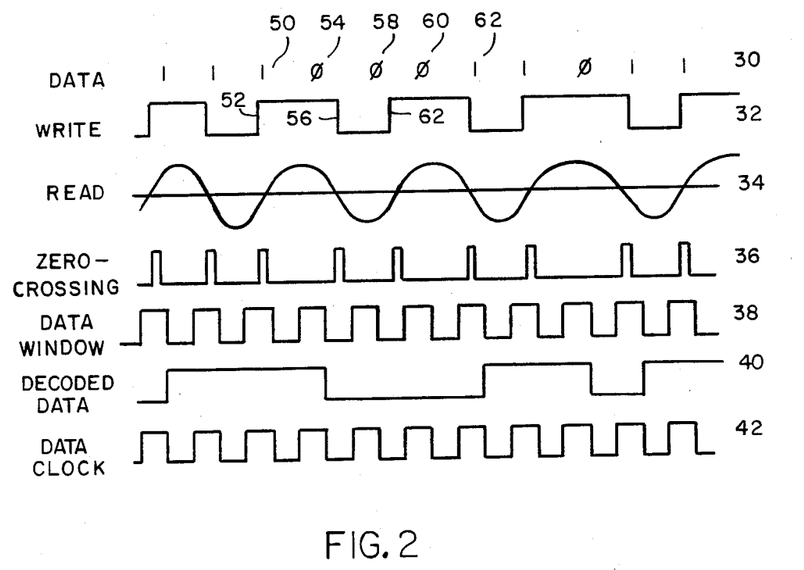
FIG. 2 shows idealized signals present in the recording, play back, and decoding in a typical system using MFM data recording.

A set of data bits 30 is shown in FIG. 2 along with the write signal 32 used to record the data. Also shown is a set of selected signals 34, 36, 38, 40, and 42 from an illustrative playback and decoding system. The illustrative playback and decoding system is shown in a simplified block diagram in FIG. 3.

The data bits 30 are coded according to a modified frequency modulation (MFM) code. According to this code, each bit is recorded in a time period called a bitcell. Each bitcell includes a first portion which is a data window and a second portion which is a clock window. In FIG. 2, the bitcells extend from one rising edge to the next rising edge of the Data Window signal 38, the data windows are marked by the high portion of the Data Window signal 38, and the clock windows are marked by the low portion of the Data Window signal 38. As shown in FIG. 2, the data and clock windows are of equal duration; as will be discussed below, these windows may alternatively be of unequal duration.

A data bit 50 having a binary value of "1" is encoded in the Write signal 32 by a transition 52 during the data window portion of the data bit's bitcell. Because bit 50 is of value "1", no transition is written in the clock window portion of the bitcell.

A data bit 54, like all bits of value "0", is encoded in the Write signal 32 with no transition in the data window. Bit 54 is also encoded by including a transition 56 in the clock window. The transition 56 is included because the following bit 58 is also of value "0". The bit 58 is of value "0" and is followed by a bit 60 of value "0". Thus, like bit 54, bit 58 is encoded by no transition in the data window and by a transition 62 in the clock window.

Bit 60 is of value "0", but differs from bits 54 and 8 in that bit 60 is followed by a bit 62 of value "1", rather than value "0". Bit 60 is encoded in the Write signal 32 with no transition in either the data window or the clock window.

As can be seen from Write signal 32 in FIG. 2, the distances between transitions that can occur in an MFM signal are 1, 1.5, and 2 bitcells.

The Write signal 32 is used to drive the current in the write head, which is used to magnetize a recording medium. Transitions in the Write signal 32 correspond to transitions in direction of the magnetic flux of the recording medium.

Figure 3:
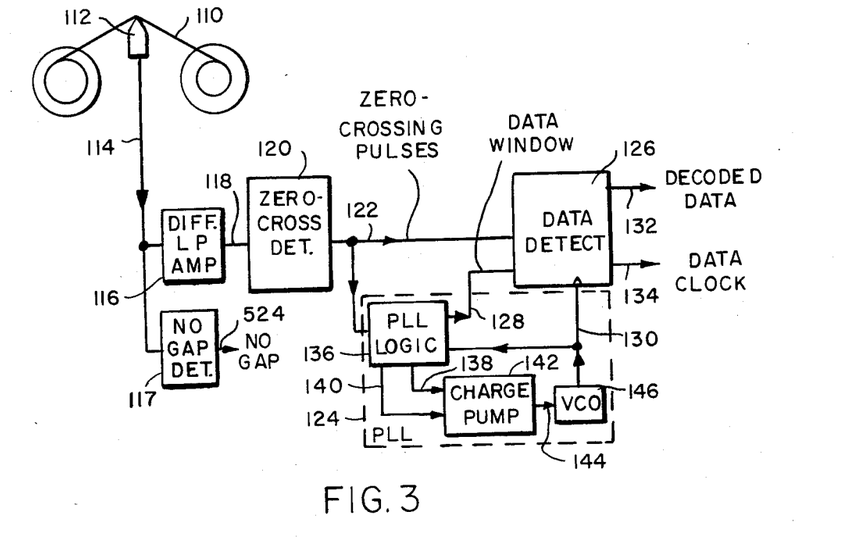
FIG. 3 is a simplified block diagram of circuitry involved in the playback and decoding of an MFM signal.

With reference to FIG. 3, to play back a recording of MFM encoded data, the recorded tape 110 is passed across a read head 112 generating a signal 114. The mechanism by which the read head 112 senses the magnetization of the tape 110 results in the signal on line 114 being a filtered and differentiated form of the Write signal 32; peaks in the signal on line 114 correspond to transitions in the Write signal on line 32. The signal 114 is processed by a circuit 116 which amplifies, low pass filters, and differentiates the signal on line 114, producing a Read signal 34 on line 118. Due to the second differentiation, the zero-crossings of signal 34 correspond to the peaks of the signal on line 114 and therefore correspond to the transitions in the signal 32.

The signal on line 114 is also processed by a circuit 117 which asserts a No Gap signal 524 when it detects the presence of a recorded signal. The No Gap signal 524 is used in the process of reading a block of data.

The Read signal 34 is processed by a zero-crossing detector 120 to produce a Zero-Crossing signal 36 on line 122. The zero crossing signal is a series of pulses each of which corresponds to a zero-crossing in the Read signal 34.

The Zero-Crossing signal 36 is provided to a phase-locked loop (PLL) circuit 124. The PLL 124 generates a Data Window timing signal 38 on line 128 and a Clock timing signal on line 130, the timing of each of which is adjusted in accordance with the Zero-Crossing signal 36 as will be described more fully below. The PLL includes digital logic circuitry 136 which, among other things, performs a phase comparison between the Zero-Crossing signal 36 and a counted-down version of the Clock signal from line 130. The result of this phase comparison is the selective activation of a pump-up signal on line 138 and a pump-down signal on line 140. The pump-up and pump-down signals drive a charge pump 142 which creates a loop error signal on line 144 as a result of its pumping activity. The loop error signal is connected to the frequency control input of a voltage-controlled oscillator (VCO) 146. The VCO 146 produces the Clock signal on line 130, which it adjusts as indicated by the error signal on line 144. The frequency of the Clock signal on line 130 produced by the VCO is a multiple of the Data Window signal 38. In one particular embodiment the Clock signal is approximately 15 MHz and the Data Window 38 approximately 500 KHz. A modulus thirty counter included in the logic 136 derives the Data Window 38 from the Clock signal on line 130.

The Zero-Crossing signal 36 is also provided to a data detect circuit 126, as are the Data Window 38 and Clock signals. The data detect circuit 126 is a synchronous digital circuit which is clocked by the Clock signal. The data detect circuit 126 determines if a zero-crossing occurs during a data window, and energizes a Decoded Data signal 40 on line 132 accordingly. The data detect circuit 126 also provides a Data Clock signal 42 on line 134, which identifies each of the sequential bits represented by the Decoded Data signal 40 on line 132; the value of the Decoded Data signal 40 at the time of each rising edge of the Data Clock 42 is the value of a bit in the decoded data stream.

In the system shown in FIG. 3, the Data Clock signal 42 and 134 is the same as the Data Window signal 38. Control signals generated external to the components of FIG. 3, would be used to gate the Data Clock signal 42 so that there are only rising transitions in the Data Clock when there is valid data. For example, the Data Clock would be gated off during a gap 12, the preamble 14, and the postamble 16.

Figure 6:
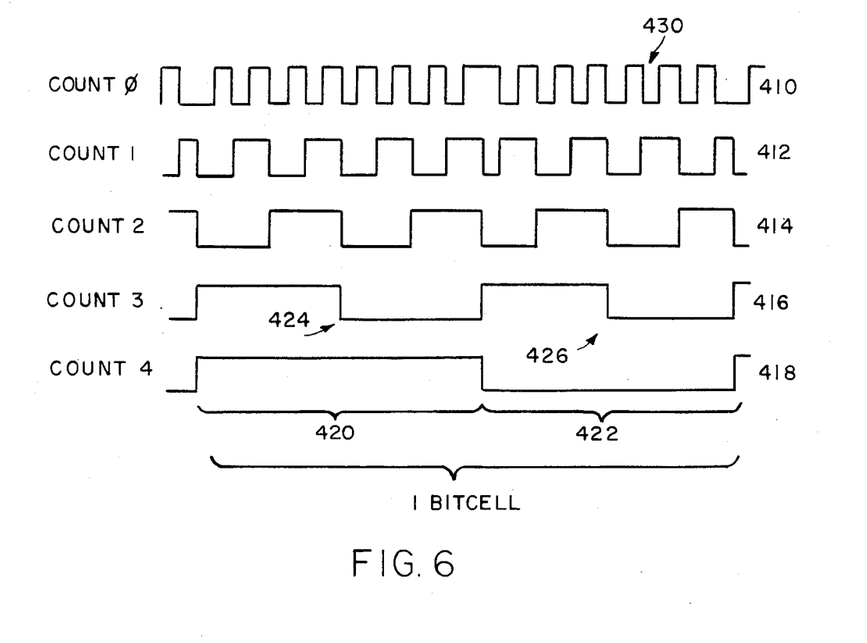
FIG. 6 shows signals generated by the PLL which define a bitcell and certain times within the bitcell.

Referring to FIG. 6, the PLL generates a signal 418 which defines a series of bitcells (only one of which is shown in FIG. 6), and defines a data window 420 and a clock window 422 within each bitcell. The PLL also generates a signal 416 which defines comparison times 424 and 426 within the data and clock windows, respectively. The PLL adjusts the frequency of the signal 418 to be the same as the bit rate of the MFM coded data which is read from the tape. Further, the PLL adjusts the phases of the signals 418 and 416 so that data-type zero-crossings occur approximately at the data window comparison time 424 and that clock-type zero-crossings occur approximately at the clock window comparison time 426.

The signals 410, 412, 414, 416, and 418 are the outputs of a modulo 30 (mod-30) counter (a counter having a period of 30 counts) which is part of the PLL logic 136 (in FIG. 3). The mod-30 counter is driven by the VCO Clock signal. When the PLL is locked to a bit rate of 500 KHz, the VCO Clock signal will be 15 MHz. Since the most significant bit of the mod-30 counter defines bitcells (as shown by signal 418 in FIG. 6), the counter resolves a bitcell into 30 units. The data window is 16 counts wide and the data window comparison time is in the center of the data window, with 8 counts on either side. The clock window is 14 counts wide, and the clock window comparison time is in its center, with 7 counts on either side. The most significant bit, which is represented by signal 418, defines the data window and the clock window. In particular, the portion of the bitcell in which the signal 418 (that is the most significant bit) defines high is the data window 420 and the portion in which the signal 418 is low defines the clock window 422. When the PLL is locked to the zero-crossings indicated by signal 36 (FIG. 2), the zero-crossings occur at the centers of the data and clock windows, which are marked by the high-to-low transitions 424 and 426 of the signal 416.

The PLL detects phase errors by comparing the times at which zero-crossings occur with the data window and clock window comparison times. The detected phase error is used to adjust the VCO such that the zero-crossings occur more closely in time to the comparison times. If a zero-crossing occurs early then the VCO is slow; thus the charge pump is set to pump up. When a zero-crossing occurs late, the VCO is too fast; thus the charge pump is set to pump down. The error signal is adjusted according to the difference in time between when a transition actually occurs and when it is expected to occur.

In general terms, comparisons of times to adjust the error signal are accomplished as follows: occurrences of events (zero-crossings and comparision times) set and clear the pump-up and pump-down signals on lines 138 and 140; the charge pump processes these pump-up and pump-down "commands" to generate the error signal on line 144. The specification of which events cause the pump-up and pump-down signals to change depends on whether the PLL is operating in data mode or in sync mode.

The PLL can operate in either of two modes, namely a sync mode and a data mode. The two modes differ in how the times of zero-crossings are compared with the data window and clock window comparison times 424 and 426: when in sync mode, the zero-crossings are compared only with the data window comparison time 424; when in data mode, the zero-crossings are compared with the data window comparison time 424 or the clock window comparison time 426 depending on the window in which the zero-crossing occurs.

In sync mode the pump-up and pump-down signals are adjusted on the occurrence of each zero-crossing. If the pump-down signal is set, when a zero-crossing occurs, then the pump-down signal is cleared. If the pump-down signal is not set when a zero-crossing occurs, then the pump-up signal is set. In sync mode the pump-up and pump-down signals are also adjusted at each data window comparison time 424 (the falling edge of the signal 416 during the high portion of signal 418): if the pump-up signal is set when a zero-crossing occurs, it is cleared; if the pump-up is not set, the pump-down signal is set.

Thus, in sync mode, pump-up is set for the time between an early zero-crossing and its expected time (the data window comparison time), and pump-down is set for the time between the expected time (the data window comparison time) and a late zero-crossing.

In data mode zero-crossings are compared with both the data window comparison time and the clock window comparison time. Since the system reading an MFM signal is not able to know in advance whether a zero-crossing is to occur in any particular window, during data mode the system cannot prepare for late zero-crossings by setting the pump-down signal; the system must wait for a late zero-crossing before it knows that a zero-crossing is late. (This differs from sync mode in which a zero-crossing is due to occur in every data window.)

In data mode, early zero-crossings are handled as follows: for each zero-crossing occurring before the comparison time 424 or 426 of the window in which the zero-crossing occurs (in other words, zero-crossings occurring during the high portion of signal 416), the pump-up signal is set; the pump-up signal is cleared when each data window and each clock window comparison time occur.

In data mode, late zero-crossings are handled as follows: for each zero-crossing occurring after the comparison time 424 or 426 of the window in which the zero-crossing occurs (in other words, zero-crossings occurring during the low portion of signal 416), the pump-down signal is set, load the complement of the count indicating the time since the center of the window (this count is the complement of the 4 least significant bites of the mod-30 counter) represented by the state of the COUNT 0 through COUNT 3 signals 410–416 is loaded into an auxiliary counter (74LS163). The auxiliary counter is counted up with the same clock that is driving the mod-30 counter, and when it overflows the pump-down is cleared. For example, when a zero-crossing occurs three counts late, at a time 430, the four least significant bits of the mod-30 counter are 0010. The complement is 1101. This will provide an overflow on the third following count (the count will progress to 1110, to 1111, to 0000 with an overflow). Thus the pump-down signal will be set for a period of time equal to the time by which the zero-crossing was late.

Data mode is used to lock to actual MFM data. In an MFM signal each bitcell may contain a zero-crossing in the data window, a zero-crossing in the clock window, or there may be no zero-crossing at all in the bitcell. The PLL is designed so that the lack of a zero-crossing will not result in a change in the error signal. The error signal is only adjusted when a zero-crossing does occur. In data mode the time of each zero-crossing is compared to the comparison time of the window in which the zero-crossing occurs.

Sync mode is used to lock to the synchronization portion of the preamble of a data block and is also used to lock to a fixed frequency oscillator when there is no read signal (in a gap, or when the tape is not being read). In sync mode, zero-crossing pulses are assumed to occur once per bitcell and always at the same time within the bitcell. This is equivalent to a data stream that is all 1s. (A data stream of all 0s also has one zero-crossing per bitcell, but they occur in the clock window. Because the data window is wider than the clock window, it is easier to synchronize if the data stream is all 1s rather than all 0s.) In sync mode all zero-crossings are compared with the nearest data window comparison time, whether the zero-crossing occurs in a data window or in a clock window.

The PLL can lock onto harmonics when in data mode. However, it cannot lock onto harmonics or beat frequencies in sync mode. During the time when there is the greatest danger of locking to harmonics or beat frequencies, which is during the synchronization period preceding each data block, the sync mode can be used because data is not being decoded during that period. Thus the use of different lock modes provides performance that cannot be achieved with a single mode of operation that must be used both in data and during the synchronization period.

Once the data window has been defined, the data can be decoded by following the rule that the presence of a zero-crossing in the data window indicates that the bit corresponding to that bitcell is a 1 and the lack of a zero-crossing in the data window indicates a 0. The zero-crossings in the clock window are used to help position the data window (as described above in the context of operation of the PLL), but are not used directly in determining the value of the data.

The data detect circuit 126 (FIG. 3) generates the Decoded Data signal 40 on line 132 and the Data Clock signal 42 on line 134 as follows. A zero-crossing latch is cleared prior to each data window. If a zero-crossing occurs during a data window, the zero-crossing latch is set. At the end of each data window, that is on the falling edges of the count 4 signal, the contents of the zero-crossing latch are transferred to a latch which drives the Decoded Data signal. As the Decoded Data signal changes on the falling edge of the data window, a conservative time to read the Decoded Data signal is on the rising edge of the data window. Thus the Data Clock signal is a gated form of the data window signal, and the rising edge of the Data Clock signal is to be used indicate when the Decoded Data signal is to be read.

Statistically, due to the nature of the MFM code, there tends to be more error in the time of occurrence of data-type zero-crossings than in clock-type zero-crossings. Thus, the performance of an MFM decoder can be improved by making the data window wider than the clock window, as is shown in FIG. 6. Further, it may be more likely that errors in zero-crossing timing will make late zero-crossings more likely than early zero-crossings. Thus, an advantage may be gained by placing the comparison times ahead of the centers of the windows. Although the mod-30 counter whose output is illustrated in FIG. 6 places the comparison times 424 and 426 in the centers of the corresponding windows 420 and 422, counters can be designed to place the comparison times at any count within the windows, including at different relative times in the data and clock windows.

The PLL and data detect circuitry include some circuitry to facilitate the reading of data blocks. However, most of the details of the block-level operations are controlled by the system in which the PLL and data detect circuitry are embedded. The signals that must be provided by the external system are VCO Enable on line 520, Read Enable on line 522, and Fixed Clock on line 526.

There are times when there is no signal for the PLL to lock to, for example, during a gap or when the tape is stopped. To prepare the PLL to lock quickly to a read signal when it becomes available, the PLL is locked to a fixed freqency that is the same as the expected bit rate when reading data. This frequency is provided by the Fixed Clock signal on line 526 which is set at 500 KHz.

The VCO Enable signal controls whether the PLL locks to the zero-crossing pulses 122 or to the Fixed Clock 526. The Read Enable signal controls whether the PLL is in sync mode or in data mode and also drives again control signal on line 218 for the charge pump. As no data can be read unless the PLL is locked to the data, Read Enable is not asserted unless VCO Enable is asserted.

When switching from locking to the Fixed Clock 526 to locking to Zero-Crossing pulses on line 122, the PLL is arranged to start in-phase with the zero-crossing pulses 122. In particular, when the VCO Enable signal goes high, the mod-30 counter is set to start counting from a value of 11111 upon the occurrence of the next zero-crossing. As is shown in FIG. 6, the time that the mod-30 counter has the value 11111 is the time of the center 424 of the data window 420.

The PLL is also arranged to start in-phase when the PLL is switched from locking to the Zero-Crossing pulses 122 to locking to the Fixed Clock signal on line 526. In particular, when VCO Enable signal goes low, the mod-30 counter is set to start counting from a value of 11111 upon the occurrence of the next pulse in the Fixed Clock signal on line 526. Thus in either case when the PLL begins locking to a new signal, the PLL starts out synchronized with the new signal.

When not reading data, the VCO Enable and Read Enable signals are not asserted. This causes the PLL to operate in sync mode and to lock to the Fixed Clock signal on line 526 and sets the gain of the charge pump to be high. The procedure for reading a block of data begins when there is no MFM read signal, in other words, in a gap 12 between data blocks 10. When the Preamble 14 preceding a data block has begun, as indicated by the assertion of the No Gap signal 524, the external system asserts the VCO Enable signal 520 which causes the PLL to lock to the zero-crossing pulses 122 rather than the Fixed Clock 526. After a period of time has passed such that the PLL has had sufficient time to lock and yet the end of the Preamble 14 has not been reached, the Read Enable signal 522 is asserted, causing the PLL to switch to data mode.

At this point the data detection circuit 126 will be detecting a series of 1s because in sync mode, the PLL aligns the zero-crossings in the data window. The first 0 to be detected will be the mark bit 18. The bits following the mark bit 18 will be the data block 10. The data detect circuitry 126 maintains the Data Clock signal on line 134 disabled until the mark bit 18 has been detected, after which the Data Clock signal 134 is enabled. Thus the Data Clock can be used to determine when the Decoded Data signal on line 132 contains valid data.

The external system can determine that the data has ended either from the data itself (for example, by expecting a certain number of data bits) or from the No Gap signal 524, which indicates whether or not a signal is present. After the data block has been read, the external system sets the PLL to lock to the Fixed Clock (by use of the VCO Enable signal on line 520), sets the PLL to sync mode (with the Read Enable signal on line 522), and increases the gain of the charge pump (with the Read Enable signal on line 522).

A power detect circuit 536 detects whether the voltages of the power supplies are above preset thresholds. When the system is first turned on, a DC OK signal 538 is not asserted until the voltages of the power supplies exceed the preset thresholds, after which the DC OK signal is asserted. This prevents the charge pump from pumping until the power is fully applied.

Figure 7:
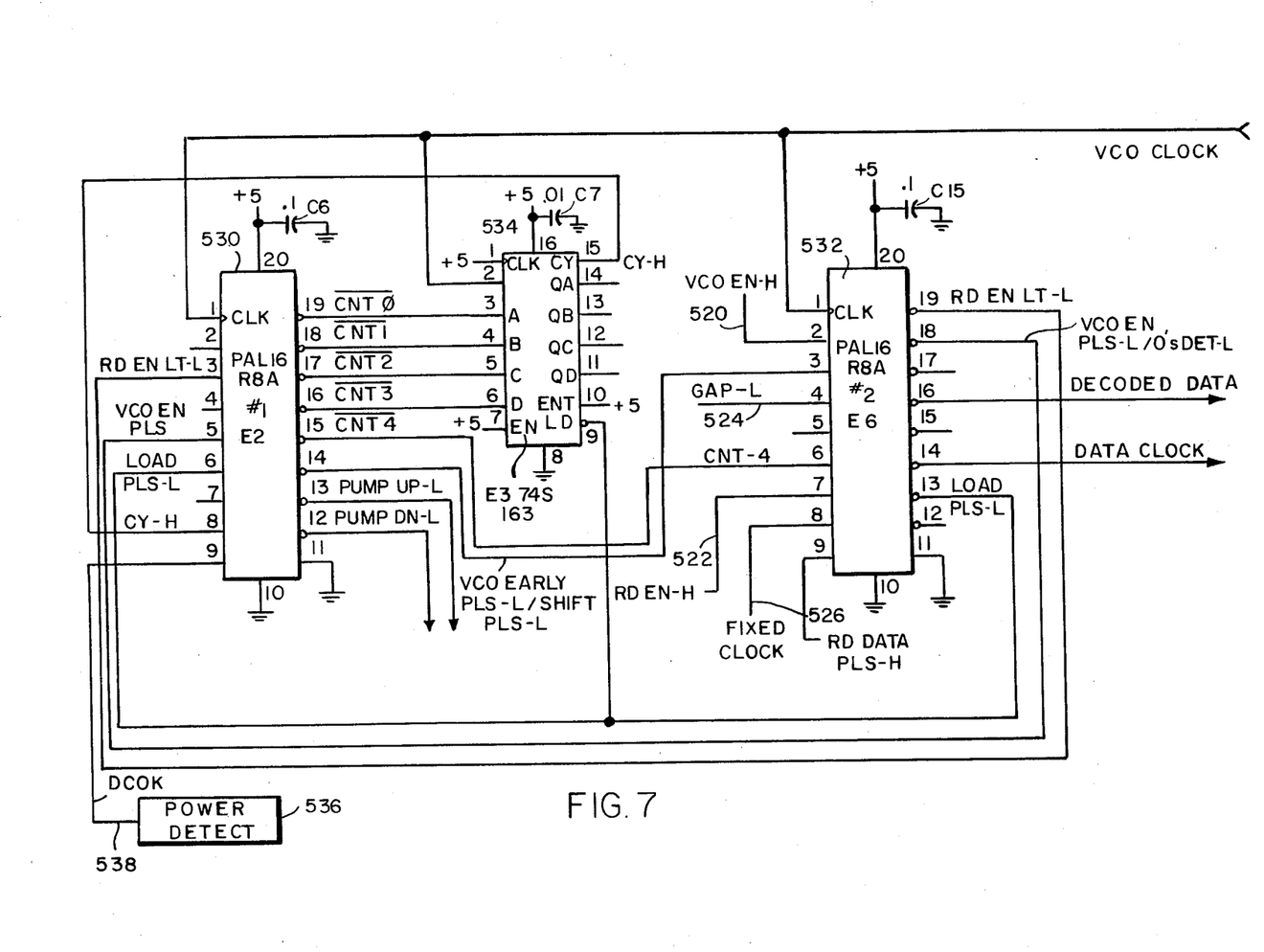
FIG. 7 is a circuit diagram showing the interconnection of two programmable logic arrays and auxiliary counter, which form a portion of the PLL and perform data detection.
Figure 8:
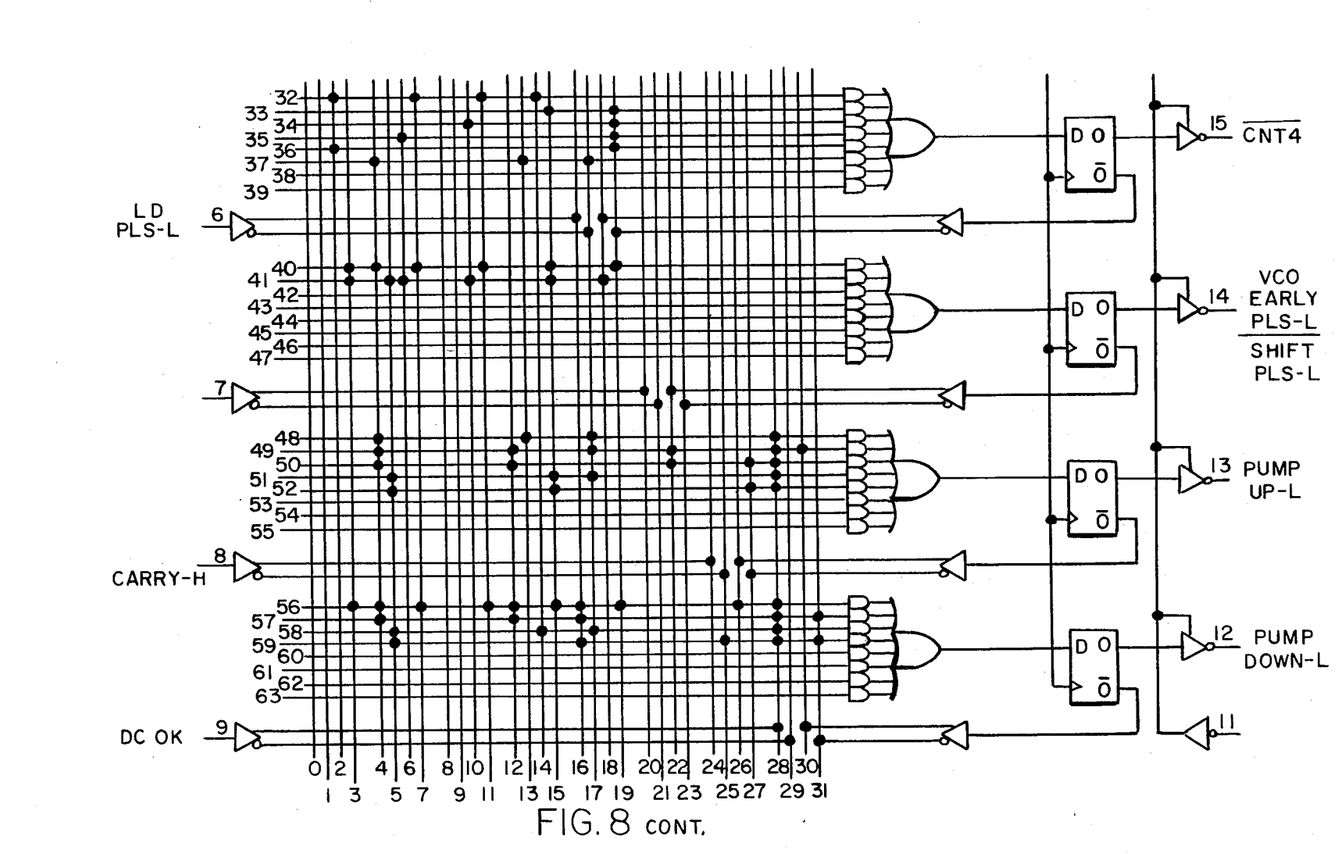
FIGS. 8 and 9 illustrate the internal connections in the two programmable logic arrays depicted in FIG. 7.
Figure 9:
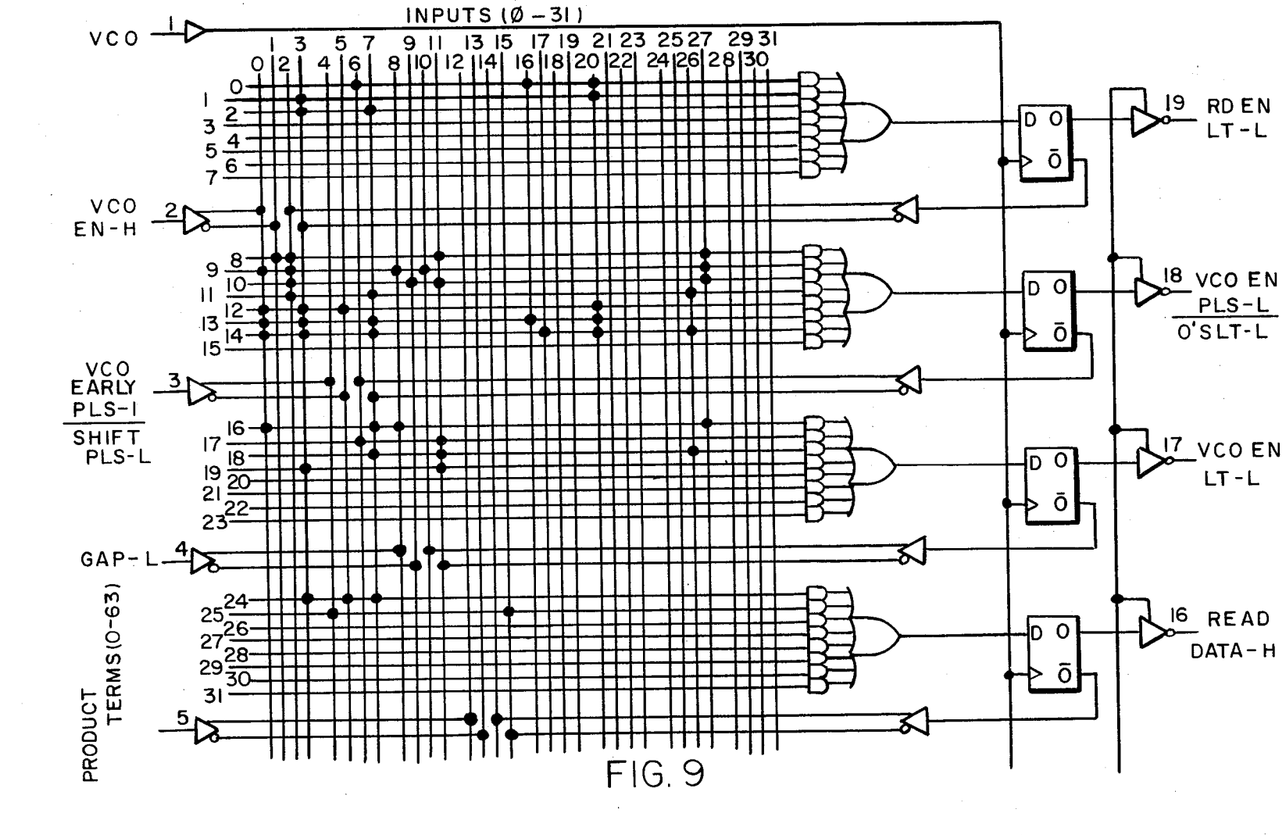

FIGS. 7, 8, and 9 disclose an implementation of the PLL logic 136 and the data detect circuitry 126 which use a counter 534 (implementing the auxiliary counter) and two programmable array logic chips (PALs) 530 and 532. FIG. 7 shows the interconnection of these three components 530, 532 and 534. FIGS. 8 and 9 show the internal connections in the PALs 530 and 532 respectively. The PALs perform the logical AND of all of the signals connected to a horizontal line, and perform the logical OR of all of the horizontal lines in one group of eight lines.

Figure 4:
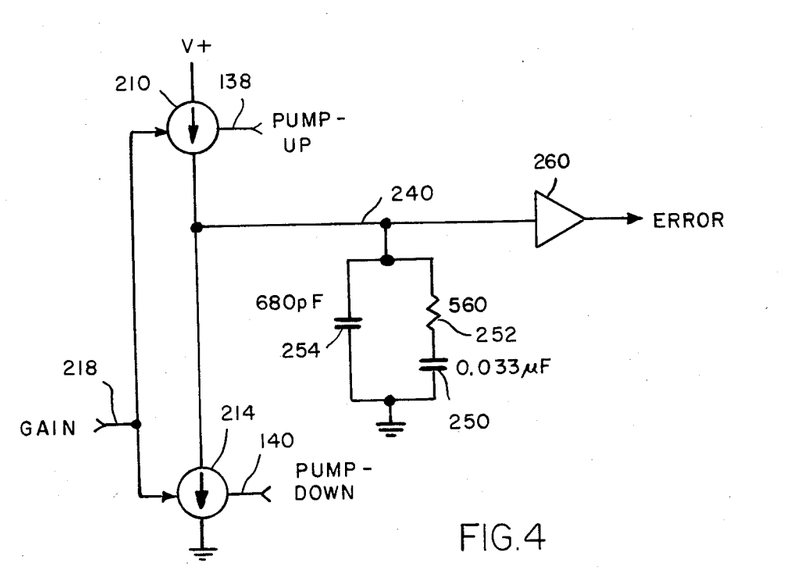
FIG. 4 is diagram of a charge pump for generating a PLL error signal.

FIG. 4 shows a charge pump for generating PLL error signal in response to pump-up and pump-down signals. The charge pump includes two digitally controlled current sources; namely a positive current source 210 controlled by the pump-up signal on line 138; and a negative current source 214 controlled by the pump-down signal on line 140. Under the control of a gain signal on line 218, the current sources 210 and 214 can each provide either 0.8 mA or 4 mA of current; this allows the gain of the PLL to be set at either of two values. When not reading data, the gain of the charge pump is set high; this provides quicker locking than does the low gain. When reading data, the gain is set low, providing less jitter in the VCO Clock 130, making data decoding more accurate.

The outputs of the two current sources are combined into one output at a node 240. A charge storing circuit is connected between the node 240 and ground. The charge storing circuit comprises a capacitor 250 connected in series with a resistor 252, this series connection being connected in parallel with a capacitor 254.

During each bitcell in which a zero-crossing occurs, either the pump up or the pump-down signal is set for a period of time equal to the number of counts of the mod-30 counter the zero-crossing was away from the appropriate comparison time. Thus for a portion of most bitcells a constant pulse of positive (for pump-up) or negative (for pump-down) current is applied to the charge storing circuit.

The voltage at the node 240 is buffered by current amplifier 260 and is the PLL error signal that drives the voltage control on the VCO. The voltage at the node 240 is positive. When the positive current source 210 is turned on by the pump-up signal 138, the voltage at the node 240 increases. When the negative current source is turned on, the voltage at the node 240 decreases.

The values of the components, especially the capacitor 250 and the resistor 252 are selected to determine the dynamic characteristics of the PLL. The selection of component values will be aided by understanding the roles of the three components. The following discussion explains these roles by starting with a charge storage circuit comprised solely of the capacitor 250, then adding the resistor 252, and finally by adding the capacitor 254.

The capacitor 250 is the basic component of the charge storing circuit. If it is the only component then, during each current pulse, the voltage on the capacitor ramps up or down to a new voltage level. This results in the VCO shifting to a new frequency.

The series resistor 252 is added to give lead to the loop. With the addition of the resistor, during each current pulse, there is a voltage drop across the resistor. This provides to the VCO a voltage step that corresponds in time to each current pulse. During each voltage pulse the VCO changes frequency, and, after the pulse, the VCO changes back to the frequency it was at prior to the pulse plus the shift caused by the capacitor 250. Thus the addition of the resistor provides a phase shift with each current pulse.

The parallel capacitor 254 is added to spread the voltage pulse provided by the resistor over a larger portion of the bitcell. When the loop is locked and the zero-crossings are occurring close to their expected times, the portion of the bitcell during which either pump-up or pump-down is set is quite small. The capacitor 254 effectively spreads this pulse out over a larger portion of the bitcell. For short current pulses, a few counts, most of the current goes to ramp up the voltage on the capacitor 254. Following the current pulse the charge on the capacitor 254 is shifted to the capacitor 250 through the resistor 252. For short current pulses, the charge and discharge of the capacitor 254 results in a wider and lower amplitude pulse than would occur if it were absent from the charge storage circuit. The effect is to enable the VCO to operate over a narrower range, and to make the charge pump more linear. The value of the capacitor 254 controls the extent of the pulse spreading effect and does not have as great influence on the loop dynamics as the values of the capacitor 250 and the resistor 252.

A smaller value for the capacitor 250 results in a greater gain for the charge pump and therefore a faster lock. A smaller value for the resistor 252 also results in a faster lock, but tends to reduce the size of frequency step that the PLL can accept as input and remain locked. In adjusting the values of the capacitor 250 and the resistor 252 it may be advantageous to select a resistor value first, then adjust the capacitor value.

To obtain the maximum dynamic range from a PLL's VCO, the nominal VCO frequency, that is, the frequency of VCO when the control voltage is in the center of the range, should be approximately the frequency to which the PLL is locked. The circuit shown in FIG. 5 automatically adjusts the nominal frequency to the frequency to which the PLL is locked. This eliminates the need to make manual adjustments to compensate for component tolerances and, further, provides continual adjustment which can compensate for changes in the system of which the PLL is a part. For example, if a tape is played at a speed differing from that at which it was recorded, the frequency to which the PLL must lock will differ from the usual lock frequency. Automatic adjustment of the nominal frequency can allow the PLL to obtain the benefit of the full dynamic range of the VCO even under such abnormal circumstances.

Figure 5:
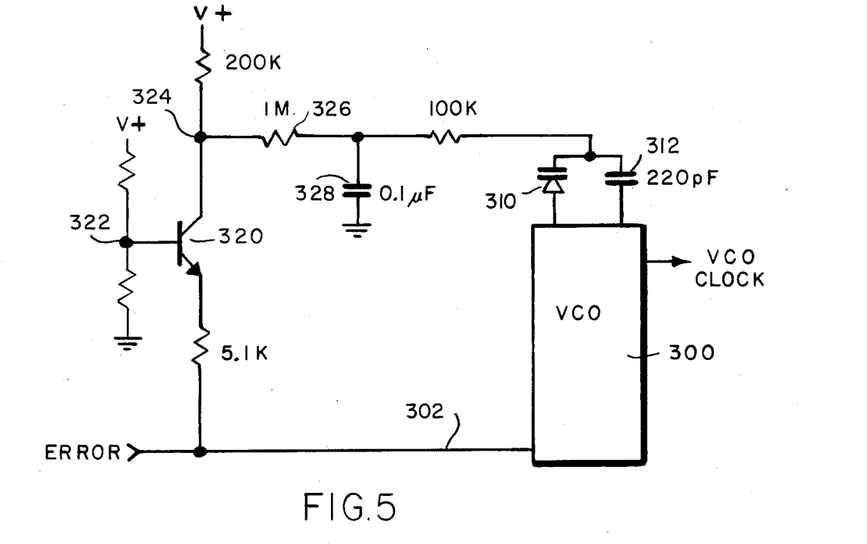
FIG. 5 is diagram of a auto-zero circuit and its connection to a voltage-controlled oscillator.

In one specific embodiment, single integrated circuit (74S124) is used for the VCO 300. A diode 312 and capacitor 312 are connected to the timing capacitor terminals of the VCO 300. The diode, which is reverse biased, functions as an electrically variable capacitor 310 and is used to adjust the VCO's nominal frequency. The capacitor 312 is used to block the DC bias voltage on the diode, preventing it from affecting the VCO. The capacitance of the diode decreases as the reverse voltage increases. Diodes are available which are designed to accentuate this feature, for example, a Motorola MV209.

For the particular embodiment being discussed, the center of the range of the VCO frequency control 302 is three volts. The bias voltage on the diode 310 is controlled by a transistor 320. The base 322 of the transistor 320 is tied to a voltage of about 3.8 volts. If the error signal goes above three volts (indicating that a frequency higher than the present nominal frequency is required by the PLL), the current through the transistor 320 decreases and the voltage at the collector of the transistor 322 increases; this, through an RC filter (a resistor 326 and a capacitor 328) slowly raises the bias voltage, reducing the timing capacitance, and thereby raising the nominal frequency. The result is to raise the nominal frequency of the VCO to the frequency at which the PLL is locked.

The time constant of the low pass filter, the resistor 326 and the capacitor 328, is chosen so that the bias voltage on diode 310 changes slowly relative to the dynamics of the PLL in which the VCO is embedded. Thus the auto-zero adjustment circuit sets the nominal frequency of the VCO to the average lock frequency of the loop, but does not respond to rapid variations about that average. The adjustment is such that when the loop is locked the error signal is at the center of the VCO's range.

The foregoing description has been limited to a specific embodiment of this invention. Additional advantages and modifications will be apparent to those skilled in the art. The invention is, therefore, not limited to the specific details, representative apparatus, and illustrative example shown and described in this specification. It is the object of the appended claims to cover all such variations and modifications as come within the true spirit and scope of the invention.

What is claimed as new and desired to be secured by Letters Patent of the United States is:

1. A phase-locked loop for use with an input signal identifying the times of a series of events comprising:
    (A) error means for generating an error signal,
    (B) clock generating means connected to said error means and responsive to the error signal for producing a clock signal,
    (C) timing means connected to said clock generating means and responsive to the clock signal for producing timing signals which define a data window, a clock window, a comparison time within the data window, and a comparison time within the clock window,
    (D) comparison means connected to receive the input signal and connected to said timing means for determining whether the time of each event occurs in the data window or in the clock window,
    said error means being connected to said timing means and to said comparison means and connected to receive the input signal, and being arranged to adjust the error signal as a function of the time difference between the time of each event and the comparison time in the window in which the event occurs.

2. The phase-locked loop of claim 1 in which:
    said timing means includes a first counter which, during the portion of a window following the window's comparison time, produces a signal indicative of the number of clock cycles since the comparison time, and
    said error means includes:
        (1) a charge pump which accepts a pump-up signal and a pump-down signal and is operable such that while the pump-up signal is set said charge pump drives the error signal in one direction, and while pump-down signal is set drives the error signal in the opposite direction, (2) a second counter connected to said first counter, said second counter capable of being loaded with a number from said first counter and producing an overflow when the number of clock cycles indicated by a loaded number has passed following the loading of the number, (3) means for setting the pump-up signal in response to the occurrence of an event in a window prior to the window's comparison time, (4) means for clearing the pump-up signal in response to the occurrence of a comparison time, (5) transfer means for loading said second counter with the number from said first counter, said transfer means being responsive to the occurrence of an event in a window after the window's comparison time, (6) means for clearing the pump-down signal in response to the overflow.

3. The phase-locked loop of claim 2 wherein said timing means produces timing signals which define the comparison time within the data window and the comparison time within the clock window to be at times other than the centers of the respective windows.

4. The phase-locked loop of claim 2 wherein said timing means produces timing signals which define the data window and the clock window to be of different sizes.

5. A phase-locked loop for use with an input signal indicating the times of a series of events comprising:

(A) a charge pump for producing an error signal and which accepts a pump-up signal and a pump-down signal and is operable such that while the pump-up signal is set said charge pump drives the error signal in one direction, and while pump-down signal is set drives the error signal in the opposite direction, (B) clock generating means connected to said charge pump and responsive to the error signal for producing a clock signal, (C) timing means connected to said clock generating means and responsive to the clock signal for producing timing signals which define a bitcell and a comparison time within the bitcell, (D) control means connected to the timing means and connected to receive the input signal and being arranged to control the pump-up and pump-down signals as follows:

(1) set the pump-up signal in response to the occurrence of an event if the pump-down signal is not set, (2) clear the pump-up signal in response to the occurrence of a comparison time, (3) set the pump-down signal in response to the occurrence of a comparison time if the pump-up signal is not set, (4) clear the pump-down signal in response to the occurrence of an event.

6. A phase-locked loop having two locking modes and for use with a signal indicating the times of a series of events comprising:

(A) error means for generating an error signal, (B) clock generating means connected to the error means and responsive to the error signal for producing a clock signal, (C) timing means connected to said clock generating means for producing timing signals which define a data window, a clock window, a comparison time within the data window, and a comparison time within the clock window, said timing means including first counter which, during the portion of a window following the window's comparison time, produces a signal indicative of the number of clock cycles since the comparison time, and (D) comparison means connected to said timing means and connected to receive the input signal for determining whether the time of each event occurs in the data window or in the clock window, said error means comprising:

(1) a charge pump which accepts a pump-up signal and a pump-down signal and is operable such that while the pump-up signal is set said charge pump drives the error signal in one direction, and while pump-down signal is set drives the error signal in the opposite direction, (2) a second counter connected to said first counter and capable of being loaded with a number and producing an overflow when the number of clock cycles indicated by a loaded number has passed following the loading of the number, (3) transfer means for loading said second counter with the number from said first counter in response to the assertion of a transfer signal, and (4) control means connected to said timing means, to said comparison means, and to said second counter and connected to receive the input signal and to receive a mode signal for selecting a first mode or a second mode, said control means being arranged to control the pump-up, pump-down, and transfer signals when the first mode is selected as follows:

(a) set the pump-up signal in response to the occurrence of an event in a window prior to the window's comparison time, (b) clear the pump-up signal in response to the occurence of a comparison time, (c) assert the transfer signal in response to the occurrence of an event in a window after the window's comparison time, (d) clear the pump-down signal in response to the overflow, said control means being arranged to control the pump-up and pump-down signals when the second mode is selected as follows:

(e) set the pump-up signal in response to the occurrence of an event if the pump-down signal is not set, (f) set the pump-down signal in response to the occurrence of the data window's comparison time if the pump-up signal is not set, (g) clear the pump-down signal in response to the occurrence of an event, (h) clear the pump-up signal in response to the occurrence of the data window's comparison time.

7. The phase-locked loop of claim 1 wherein said clock generating means comprises a voltage-controlled oscillator which produces the clock signal with a frequency controlled by a signal at a frequency selection input, the error signal being connected to said frequency selection input, said voltage-controlled oscillator comprising:

(1) a capacitor which controls the range of frequencies over which a signal at the frequency selection input can control the frequency of the clock signal, (2) adjustment means connected to said capacitor for electronically adjusting the capacitance of said capacitor, said adjustment means being responsive to the signal at said frequency control input, said adjustment means being arranged to adjust the capacitance substantially more slowly than the rate at which said error means changes the error signal.

8. The phase-locked loop of claim 1 wherein said error means includes a charge pump comprising:
   (1) charge storage circuit connected between a common node and charging node, said circuit comprising a resistor and a first capacitor connected in series with each other, said series combination being connected in parallel with a second capacitor,
   (2) digitally controlled pump-up means for connecting to the charging node a substantially constant positive current,
   (3) digitally controlled pump-down means for connecting to the charging node a substantially constant negative current.

9. The phase-locked loop of claim 8 wherein said first capacitor has at least ten times as much capacitance as said second capacitor.

* * * * *